US011124624B2

(12) United States Patent
Penari (10) Patent No.: US 11,124,624 B2
(45) Date of Patent: Sep. 21, 2021

(54) FLEXIBLE METAL POLYMER COMPOSITES

(71) Applicant: Metalskin Technologies SAS, Balaruc-Bains (FR)

(72) Inventor: Stephane Penari, Palaruc-les-Bains (FR)

(73) Assignee: Metalskin Technologies SAS, Balaruc-Bains (FR)

( * ) Notice: Subject to any disclaimer, the term of this patent is extended or adjusted under 35 U.S.C. 154(b) by 316 days.

(21) Appl. No.: 15/544,376

(22) PCT Filed: Jan. 19, 2016

(86) PCT No.: PCT/EP2016/051011
§ 371 (c)(1),
(2) Date: Jul. 18, 2017

(87) PCT Pub. No.: WO2016/116442
PCT Pub. Date: Jul. 28, 2016

(65) Prior Publication Data
US 2018/0009963 A1    Jan. 11, 2018

(30) Foreign Application Priority Data
Jan. 19, 2015   (FR) ...................................... 1550411

(51) Int. Cl.
*C08K 3/08*     (2006.01)
*C08J 5/18*     (2006.01)
*C08J 5/24*     (2006.01)
*B29B 11/06*    (2006.01)
*B29B 11/16*    (2006.01)
(Continued)

(52) U.S. Cl.
CPC ................ *C08K 3/08* (2013.01); *B29B 11/06* (2013.01); *B29B 11/16* (2013.01); *B29C 51/002* (2013.01); *C08J 5/18* (2013.01); *C08J 5/24* (2013.01); *B29K 2105/16* (2013.01); *B29K 2105/20* (2013.01); *B29K 2105/256* (2013.01); *C08J 2375/04* (2013.01); *C08K 2003/085* (2013.01)

(58) Field of Classification Search
CPC ........ C08K 3/08; C08K 2003/085; C08J 5/24; C08J 5/18; C08J 2375/04; C08J 11/06; B29C 51/002; B29B 11/16; B29K 2105/20; B29K 2105/16; B29K 2105/256
See application file for complete search history.

(56) References Cited

U.S. PATENT DOCUMENTS 6,294,257 B1 *   9/2001   Tsukakoshi ................ C08J 5/18
                                                              427/180
2003/0094337 A1  5/2003   Richeson
(Continued)

FOREIGN PATENT DOCUMENTS

CA        1307889 C    9/1992
FR        3008705 A1   1/2015
(Continued)

OTHER PUBLICATIONS

Motor Boat Magazine, No. 282 Jun. 2013, pp. 133-137.

*Primary Examiner* — Samir Shah
(74) *Attorney, Agent, or Firm* — Banner & Witcoff, Ltd.

(57) ABSTRACT

The invention relates to a flexible polymer composite containing metal particles, to the method for producing said composite, and to the uses of said composite.

11 Claims, 1 Drawing Sheet

(51) Int. Cl.
  *B29C 51/00* (2006.01)
  *B29K 105/16* (2006.01)
  *B29K 105/20* (2006.01)
  *B29K 105/00* (2006.01)

(56) References Cited

U.S. PATENT DOCUMENTS

2009/0314482 A1* 12/2009 Heikkila .................. C08K 3/08
 165/185
2013/0130026 A1* 5/2013 Heikkila .................. H01F 1/01
 428/343

FOREIGN PATENT DOCUMENTS

FR 3008706 A1 1/2015
WO 2015/007883 A1 1/2015

* cited by examiner

FLEXIBLE METAL POLYMER COMPOSITES

The present invention concerns a flexible composite containing a metal powder, preferably copper, which may further comprise a woven or nonwoven web; the use of such composites in various objects or textiles such as curtains or bags; and the method for producing same.

INTRODUCTION

At the dawn of the 1980s, a novel technique appeared which revolutionized the way in which the world works metal.

This technique, which consists schematically in combining metal and binder, makes it possible to quickly coat almost any support, whatever the form or nature (laminates, melamines, wood, plastics, plaster, glass fiber, ceramics, concrete, foams, porcelain, glass and metal), while following surface details perfectly.

This true composite material is available today in several varieties, thus solving the numerous problems associated with the use of solid metal.

Thus, objects that would be too heavy or too expensive to make of solid metal, or would involve overly burdensome techniques for creating fine details, can be metallized very quickly at a fraction of the weight and price. Each composite is formed of micronized aggregates of metal, hybrid polymer binder and catalyst. The metal and the polymer binder interact in a chemical reaction which creates an extremely stable and homogeneous composite. After catalysis, the polymer and the metal bind chemically by producing a very strong adhesion between the composite thus formed and the support. The composite applies to "red" as well as "gray" metals and alloys: copper (99% pure copper compound) and alloys thereof such as bronze (compound the very great majority of which is copper alloyed with tin), brass (alloy mainly of copper and zinc), nickel-silver (alloy of copper, nickel and zinc); or iron (pure iron compound), aluminum (pure aluminum compound), "X-metal" (alloy of equal parts copper and tin), stainless steel (alloy mainly of iron, chromium and nickel), gunmetal (alloy of copper, tin and silver), tin or a compound of tin and silver, etc. New metals are added regularly to this range.

Cold metallization technology is typically applied by means of conventional paint-gun equipment. Metal composites are sprayed cold by means of an HVLP (high volume/low pressure) gun with suitable nozzles.

Recently, the Applicant showed that copper composites derived from this technology are very well suited for antifouling-type coatings in the boating industry (see, for example, the article published in "Motor Boat Magazine", No. 282 June 2013, pp. 133-137), in particular oxidized and/or phosphorized copper composites were identified (FR1357099, FR1400766, and PCT/EP2014 065 498).

However, the Applicant realized that to be able to produce such composites, it was necessary for the oxidized and/or phosphorized copper powder (such as $CuP_8$) not to be too fine.

Surprisingly, the Applicant realized that copper powders (for example oxidized and/or phosphorized) having such particle sizes can be incorporated into flexible composites, thus making it possible to mold original objects. In the case of copper powder composites, for example, the biocidal properties provided by copper are used directly in a large number of technical fields, such as the agri-food industry, the drug industry, or the field of healthcare. A few tests with metal powders other than copper validated the concept generally. Furthermore, it is possible by the method developed by the Applicant to incorporate woven or nonwoven fibers into these flexible composites, making it possible to structure the composite object and thus to envisage a wide range of further applications.

Furthermore, the particle size and the particular nature of metal powders make it possible to obtain very interesting aesthetic effects: for example, the flexible material obtained may exhibit all the visual features of a metal but with a disconcerting flexibility. Furthermore, the possibility of modulating the nature of the powder added to the polymer makes it possible to vary shades, color or luster while benefiting from a flexibility that makes it possible in certain cases to obtain substantial contact comfort (grip and/or thermal and/or electrical insulation).

SUMMARY OF THE INVENTION

The present invention relates to a polymer composite (solid) comprising:
  a binder, preferably of elastomer type,
  a metal powder, preferably copper and/or comprising 30% by mass of grains with a diameter greater than 45 µm, dispersed in the binder;
characterized in that said composite has a Young's modulus (E) less than 5 GPa.

The present invention also relates to a method for fabricating a composite (solid) as disclosed herein characterized by the steps:
  (a) mix a precursor of the binder in the liquid state with the metal powder;
  (b) cast the mixture obtained in step (a) into a mold;
  (c) solidify the mixture of step (b), preferably by varying the temperature or by adding a catalyst; and
  (d) release the set composite from the mold.

The present invention further relates to any object comprising the composite as described above and in particular a film, preferably heat-shrinkable, a textile, preferably on a roll, a curtain, a sleeve such as a door-handle sleeve, a garment or a part of a garment, a bag, a pouch, a tarpaulin, a tray, or a tablecloth comprising a composite as disclosed herein.

The present invention further relates to the use of a film or a textile as disclosed herein in a thermoforming process.

Definitions

Composite

A composite is a combination of two materials of different nature. In the present case, it is a matter of combining a binder with a metal powder, i.e., particles of a metal powder in a flexible, fixed (solid) organic or inorganic matrix that has been solidified using a curing catalyst or a physico-chemical treatment (light/temperature). The composite according to the invention can thus be used before it sets, to mold various and varied objects.

Binding Agent

A binding agent (also called simply "binder") according to the present invention relates to a product that binds the molecules of one element to another element, during the fusion (generally cold) of materials. For example, in the present case, a binding agent makes it possible to agglomerate the powder particles in a set polymer matrix that is more or less flexible, preferably flexible.

The binder matrix ensures particle cohesion and also transmits stresses applied to the parts.

The binder according to the invention may be an elastomer, particularly a thermoplastic elastomer.

The binder according to the invention may be an elastomer, particularly a thermosetting elastomer.

The binder according to the invention may be an elastomer, particularly a thermoplastic or thermosetting elastomer.

Thermoplastic elastomers (TPEs) are a family of copolymers (often block copolymers) or mechanical mixtures of polymers ("polymer-polymer" mixtures, often a thermoplastic polymer and an elastomer) whose members combine the elastic properties of elastomers and a thermoplastic nature (they melt and harden, reversibly, under the action of heat). This last feature makes them easier to mold, which allows the fabricator the use thermoplastic polymer formation processes (injection molding, extrusion, blow molding or overmolding).

The binder according to the invention may be thermosetting elastomer.

The role of the binder matrix is to bind particles, to distribute applied stresses, to provide the structure's chemical strength and to give the product the desired shape. The binder may be selected from thermosetting resins, but the use of thermoplastic polymers is also possible.

Thermoplastic polymers have a linear-chain structure: they must be heated in order to be shaped (the chains fold) and cooled in order to set (the chains lock). This operation is reversible.

Thermosets have a three-dimensional network structure that forms cross-links (polymerization double-bond) and hardens permanently into shape. The transformation is thus irreversible.

A binder such as a thermosetting resin is derived from a monomer that is cross-linked at room temperature by addition of a curing-type catalyst and optionally an accelerator. It passes successively from the initial viscous liquid state to the gel state, then to the infusible solid state.

The reaction is exothermic and the resin temperature gradually increases from freezing to a maximum and then slowly drops down again to room temperature.

The hardening will be all the faster or, if one prefers, the time necessary in the mold will be all the shorter, as the temperature-time curve approaches the vertical.

The hardening reaction depends on the reactivity of the resin, the shape of the fabricated object (thickness, etc.), and the nature and the balance of the catalytic system.

For thermoplastic binders, one may use polymers that are essentially technical thermoplastic polymers that have in the virgin state good mechanical properties and confer, at room temperature, improved thermal and mechanical resistance to the product according to the invention as well as good dimensional stability.

Mention may be made of those that have a temperature resistance above 100° C.: polyamide, polyethylene and polybutylene terephthalate, polycarbonate, phenylene polysulfide, polyoxymethylene and polypropylene.

One may also use thermostable thermoplastics (temperature resistance >200° C. and good mechanical properties), in particular polyamide-imide, polyether-imide, polyethersulfone or polyether-ether-ketone, for example.

Curing Catalyst

The curing catalyst enables the acceleration, indeed the feasibility, of polymerization in a flexible, fixed matrix. Heat treatment may be used in place of the catalyst. The polymer is often prepared by cross-linking. The stable three-dimensional (network) structure formed typically has thermomechanical and chemical resistance.

Elastomer

An elastomer is a polymer having "elastic" properties, for example obtained after cross-linking. Most elastomers are organic polymers. Silicone elastomers, for example, are distinguished by their mineral nature. Hooke's law deals with the elasticity of a body: a body stretches in proportion to the force exerted on it and thus determines the behavior of solids subjected to deformations:

$$\sigma = E \cdot \varepsilon$$

$\sigma$ is the stress (unit of pressure)

$\varepsilon$ is the deformation of the object (expressed as a percentage)

E is Young's modulus

The composites according to the present invention may have c values greater than 2%, 5%, 10%, 20%, 30%, 40%, 50%, 60%, 70%, 80%, 90%, 100%, 150%, 200%, 500%, 1000%. The composites according to the present invention may have c values less than 5000%, 4000%, 3000%, 2000%, 1000%, 500%, 200%, 150%, 100%, 50%, 40%, 30%, 20%, 10%, 5%, 2% in particular when it is a matter of an embodiment with a woven or nonwoven web. Typically, the composites according to the present invention may have c values between 2% and 5000%, 10% and 1000%, 50% and 500%, or between 70% and 100%.

The composites according to the present invention may be synthetic or natural, such as silicone or natural rubber elastomers, for example (see below).

Young's Modulus

Young's modulus is a classic measurement characteristic for defining the flexibility/rigidity of a material. Young's modulus is measured in pascals (Pa). The higher the value of this modulus, the more rigid the material. The various techniques for measuring this modulus are well-known to a person skilled in the art.

Powder

Generally, powder is a fractionated state of material. It is thus a plurality of units (or pieces/granules) of solid material of size generally less than the one-tenth of a millimeter (100 μm), which together constitute a "collection." The physical properties of a powder are characterized by its particle size.

Particle Size

Particle size is generally the study of the statistical distribution of the sizes of a plurality of solid units (or pieces/granules) of natural or fractionated material (i.e., a collection). Particle size analysis is the set of operations used to determine the size distribution of the component elements of a powder. A particle size distribution is a tabular or graphical representation of the experimental results of a particle size analysis.

Oxidized Copper Powder

By "oxidized copper powder" is meant, according to the present invention, first, that the powder has the particle size features defined herein (allowing it to be incorporated into a binder) and, second, that the powder has an oxidized copper content greater than or equal to 5% by mass of the total mass of copper in the powder, preferably greater than or equal to 10%, 20%, 30%, 40%, 50%, 60%, 70%, 80%, 90%, 95%, 99% or 100% by mass of the total mass of copper in the powder.

Furthermore, in the tests performed, oxidation of the copper (and/or alloys thereof) before incorporation into the composite produced a deep black (rather aesthetic) composite that endures over time.

Metallic Copper

By "metallic copper" is meant, according to the present invention, copper "$Cu^0$". However, by "metal powder" is meant, according to the present invention, any powder comprising a metal (in any form: non-oxidized, oxidized, reduced, complexed, etc.), preferably with the particle size features defined herein.

Phosphorized Copper Powder

By "phosphorized copper powder" is meant, according to the present invention, first, that the powder has the particle size features defined herein (allowing it to be incorporated into a binder) and, second, that the powder has a phosphorus content between 2% and 16% by mass, preferably 8%. In a preferred manner, the phosphorized copper powder consists of an alloy of copper and phosphorus, preferably $CuP_8$, preferably with a copper:phosphorus content expressed as a percentage by mass equal to or greater than 84%:16%, 85%:15%, 86%:14%, 87%:13%, 88%:12%, 89%:11%, 90%:10%, 91%:9%, 92%:8%, 93%:7%, 94%:6%, 95%:5%, 96%:4%, 97%:3%, 98%:2%, 99%:1%, more preferably greater than or equal to 92%:8%. In a preferred manner, the powder comprising phosphorized copper comprises as the majority element in its composition $CuP_8$, or consists of $CuP_8$, which can, for example, be included in a proportion equal to or greater than 50%, 60%, 70%, 80%, 90%, 95%, 99% by mass of the total mass of powder.

$CuP_8$ powder in the composite stabilizes the color of the copper composite (which oxidizes in air) over time. $CuP_8$ is commonly used in welding techniques. However, when $CuP_8$ powder is used in a composite according to the present invention, the flexible composites produced have exceptional aesthetic features (anthracite color) that endure over time. This is particularly surprising because $CuP_8$ in the powder state is gray in color and it is only when it is incorporated into the composite that it has this anthracite black color that also does not show the aesthetically-harmful effects of surface oxidation.

Biocide

The definition of the term "biocide" according to the present invention agrees with that of Directive 98/8/EC of the European Parliament and of the Council of 16 Feb. 1998 concerning the placing of biocidal products on the market (Official Journal of the European Communities, L 123 of 24 Apr. 1998) which defines them as being "Active substances and preparations containing one or more active substances, put up in the form in which they are supplied to the user, intended to destroy, deter, render harmless, prevent the action of, or otherwise exert a controlling effect on any harmful organism by chemical or biological means".

Room Temperature

Room temperature is generally accepted as being between 15° C. and 30° C., preferably between 20° C. and 25° C.

Molding

The composites according to the present invention are in addition used to mold objects. The molding technique consists in taking an impression that is then used as a mold. According to the present invention, molding thus consists in placing a composite in a mold whose shape it will take and then, once solidified, removing it therefrom. The object produced by this molding may be hollow or filled with the composite or another material, such as polymer without metal powder, for example.

Oxidation to the Core

By "oxidation to the core" is meant, according to the present invention, that the grains of oxidized copper powder are oxidized both on the surface and in the center of the grains of which said powder is comprised. The oxidation ratio can nevertheless vary in a straight line from the surface to the center (i.e., the center of gravity) of the grain. Typically, the surface of the grain is more oxidized than the center due to the former's greater entropy. Advantageously the center has a oxidation ratio that is 50% by mass lower than that of the surface, more advantageously still the center has a oxidation ratio that is 25% by mass lower than that of the surface, even more advantageously the center has a oxidation ratio that is 10% by mass lower than that of the surface, more advantageously than that the center has a oxidation ratio that is 5% by mass lower than that of the surface, in the most advantageous manner the center has a oxidation ratio that is identical to that of the surface.

Oxidation Ratio

Generally, oxidation involves a loss of electrons from the oxidized entity. In the present invention, this is expressed as the reaction of oxygen with the copper in the powder. For example, if the powder initially contains only copper, the "oxidation ratio" according to the present invention then refers to the initial mass amount of copper in the zero-oxidation state ("$Cu^0$") that is oxidized to CuO, i.e., the copper is in the +2-oxidation state. Generally, oxidation ratio thus refers to the amount of copper that is oxidized and thus represents a ratio of amounts (mass, mole) of the copper that is engaged in the oxidation reaction.

Generally, according to the present invention, the amount of copper being preponderant, for the sake of convenience it is referred to by approximation to mass ratios. Strictly speaking, they would be molar ratios.

Pigment

In the context of the present invention, by "pigment" is meant an insoluble coloring substance within the matrix of the material containing it. Preferably the pigment is a coloring substance for composites, i.e., for coloring the mass of a composite comprising a binding agent and optionally a curing catalyst. Preferably the pigments of the present invention make it possible to obtain flexible composites in the colors metallic or black, anthracite, or black with brown highlights, or brown dark according to the nature and concentration of the pigment (powder).

Plastic

In the context of the present invention, by "plastic" is meant (as generally accepted in the art) a material derived from a polymer-type fossil compound which can be initially (without powder according to the present invention) transparent or opaque. Typically, plastic materials are derived from so-called "intermediate" hydrocarbon products, such as ethylene, propylene, acetylene, benzene, etc., the raw materials of which are oil, natural gas and coal.

Latex

In the context of the present invention, by "latex" is meant an elastic material produced from the sap of para rubber tree (Hevea), or is synthesized by polymerization (as generally accepted in the art). Rubber is a material that can be obtained either by transformation of latex secreted by and extracted directly from certain plants (para rubber tree, for example), or synthetically from monomers derived from fossil fuels. For example, natural rubber (NR) is a polyisoprenoid. The definitions of latex and rubber are those commonly accepted in the art.

Nylon®

Nylon® is the name of the polyamide-type material often used as textile fiber. The definition of Nylon® is that commonly accepted in the art.

Film

In the context of the present invention, by "film" is meant a composite film, which may be transparent or opaque, stretchable or non-stretchable, ductile or non-ductile. Preferably, the thickness of a film according to the present invention is less than 5 cm, and may be between 0.01 mm and 2 cm, 0.1 mm and 1 cm, 1 mm and 1 cm, or between 2 mm and 5 mm. A composite film according to the present invention may be fully or partially coated with an adhesive layer, thus allowing it to be used as a coating. Furthermore, a composite film according to the present invention may be used to fabricate, by molding and/or thermoforming, other objects, in particular hollow objects that can then be filled thereafter, such as pouches for liquids.

Binder Precursor

In the context of the present invention, by "binder precursor" is meant the binder in liquid form not yet having become fixed (e.g., by chemical or physical catalysis) to produce the composite according to the present invention.

Support or Reinforcement Structure

In the context of the present invention, by "support" is meant any material used as a base onto which the composite of the invention is deposited and thus at least partially forms a bilayer. In the context of the present invention, by "reinforcement structure" is meant any material that can be at least partially embedded in the composite according to the present invention. The "support" and "reinforcement structure" may be of any nature, for example organic or inorganic, such as polyesters, silicones or thin metal objects (aluminum foil, for example). The "support" and "reinforcement structure" may be woven or nonwoven webs of natural or synthetic fibers, such as metal fibers, cotton fibers, polyester fibers, etc., having variable shape/mesh size.

DETAILED DESCRIPTION

A factor that should be taken into account in the context of the present invention is the particle size of the powder. Indeed, with regard to copper powder, the particle size of the copper powder according to the present invention will be the decisive factor in order to produce the flexible composite with the binding agent. Indeed, for certain powders, if the powder is too fine, the composite does not form correctly and has unacceptable physicochemical properties.

Thus, generally, there seems to be a threshold of around 30% by mass of grains of the powder, with respect to the total amount of powder, the diameter of which must be greater than 45 μm in order for the final coating/composite to be fabricated.

All the particle size values disclosed herein are applicable to other metals. However, it is not impossible that, for certain metals, this particle size is not a limiting factor and finer powders may be used successfully (by additional physicochemical effects: polarity, presence of fillers allowing incorporation, etc.).

Thus, the metal powder (preferably copper) can contain more than 40%, 50%, 75%, 90%, 95%, 100% by mass of grains the diameter of which is greater than 45 μm.

Furthermore, it seems important in certain embodiments of the present invention that at least a proportion, even very small, of the powder has a diameter less than 45 μm (e.g., in order to obtain continuity of the metal appearance in the composite). Thus, in a particular embodiment, the metal powder, preferably copper ($Cu^0$, oxidized, phosphorized), does not contain more than 70%, 50%, 25%, 10%, 5%, 2% or 1% by mass of grains the diameter of which is less than 45 μm.

These particular embodiments, wherein the maximum amount of grains the diameter of which is less than 45 μm is defined, may be individually combined with ranges of minimum amounts of grains the diameter of which is less than 63 μm at most in the metal powder composition, preferably copper ($Cu^0$, oxidized, phosphorized), according to the present invention. Thus, the metal powder contains at least 1%, 5%, 10%, 25%, 50%, 75%, 90% or 95% by mass of grains the diameter of which is less than 63 μm. In an embodiment of the present invention, the powder grains all are less than 500 μm in diameter. Advantageously, the powder grains all are less than 250 μm, 200 μm, 150 μm, 100 μm, 90 μm, 80 μm, 70 μm or 60 μm in diameter.

Thus, more particularly, the present invention relates to a metal powder composition, preferably copper ($Cu^0$, oxidized, phosphorized), as defined above wherein the particle size distribution has the specific features detailed below.

According to a particular embodiment of the invention, the powder contains grains of the following diameters D:

1±1% by mass of grains of diameter D1: 125 μm≤D1

2±2% by mass of grains of diameter D2: 106 μm≤D2<125 μm

12±10% by mass of grains of diameter D3: 75 μm≤D3<106 μm

10±5% by mass of grains of diameter D5: 63 μm≤D5<75 μm

20±10% by mass of grains of diameter D6: 45 μm≤D6<63 μm

40±30% by mass of grains of diameter D7: D7≤45 μm

According to an advantageous embodiment of the invention, the powder contains grains of the following diameters D:

1±1% by mass of grains of diameter D1: 125 μm≤D1

2±2% by mass of grains of diameter D2: 106 μm≤D2<125 μm

5±5% by mass of grains of diameter D3: 90 μm≤D3<106 μm

7±5% by mass of grains of diameter D4: 75 μm≤D4<90 μm

10±5% by mass of grains of diameter D5: 63 μm≤D5<75 μm

20±10% by mass of grains of diameter D6: 45 μm≤D6<63 μm

40±30% by mass of grains of diameter D7: D7≤45 μm

According to an advantageous embodiment of the invention, the powder contains grains of the following diameters D:

1±0.5% by mass of grains of diameter D1: 125 μm≤D1

2±1% by mass of grains of diameter D2: 106 μm≤D2<125 μm

5±2% by mass of grains of diameter D3: 90 μm≤D3<106 μm

7±2% by mass of grains of diameter D4: 75 μm≤D4<90 μm

10±3% by mass of grains of diameter D5: 63 μm≤D5<75 μm

20±5% by mass of grains of diameter D6: 45 μm≤D6<63 μm

50±20% by mass of grains of diameter D7: D7≤45 μm

According to a more advantageous embodiment of the invention, the powder contains grains of the following diameters D:

0.9±0.1% by mass of grains of diameter D1: 125 μm≤D1

1.5±0.5% by mass of grains of diameter D2: 106 μm≤D2<125 μm 4.5±1% by mass of grains of diameter D3: 90 μm≤D3<106 μm 6.5±1% by mass of grains of diameter D4: 75 μm≤D4<90 μm 8.5±1% by mass of grains of diameter D5: 63 μm≤D5<75 μm 18±5% by mass of grains of diameter D6: 45 μm≤D6<63 μm 60±10% by mass of grains of diameter D7: D7≤45 μm According to a more advantageous embodiment of the invention, the powder contains grains of the following diameters D:

0.9±0.1% by mass of grains of diameter D1: 125 µm≤D1
1.5±0.5% by mass of grains of diameter D2: 106 µm≤D2<125 µm
4.5±1% by mass of grains of diameter D3: 90 µm≤D3<106 µm
6.5±1% by mass of grains of diameter D4: 75 µm≤D4<90 µm
8.5±1% by mass of grains of diameter D5: 63 µm≤D5<75 µm
18±5% by mass of grains of diameter D6: 45 µm≤D6<63 µm
60±5% by mass of grains of diameter D7: D7≤45 µm According to an embodiment even more advantageous of the invention, the powder contains grains of the following diameters D:

0.9% by mass of grains of diameter D1: 125 µm≤D1
1.5% by mass of grains of diameter D2: 106 µm≤D2<125 µm
4.5% by mass of grains of diameter D3: 90 µm≤D3<106 µm
6.6% by mass of grains of diameter D4: 75 µm≤D4<90 µm
8.4% by mass of grains of diameter D5: 63 µm≤D5<75 µm
20.8% by mass of grains of diameter D6: 45 µm≤D6<63 µm
58.8% by mass of grains of diameter D7: D7≤45 µm According to an advantageous embodiment of the invention, the powder contains grains of the following diameters D:

1.0% by mass of grains of diameter D2: 106 µm≤D2
8.1% by mass of grains of diameter D3': 75 µm≤D3'<106 µm
7.9% by mass of grains of diameter D5: 63 µm≤D5<75 µm
19.2% by mass of grains of diameter D6: 45 µm≤D6<63 µm
63.8% by mass of grains of diameter D7: D7≤45 µm Traditionally, the mass percentages are added to have a cumulative particle size according to the standard ISO 4497. It is easy for the skilled person, in view of the ranges given above, simply to add the values in order to find the current particle size standards (cumulative).

As said before, these particle size values are independent of the chemical nature of the powder, and simply enable the powders to be incorporated into a binder. However, variations of particular technical effects (biocidal activity, pigmentation) can be obtained according to the fineness of the powder.

More particularly, the present invention relates to a composite as described above characterized in that the Young's modulus (E) is less than 3 GPa, less than 2 GPa, particularly less than 1 GPa, preferably less than 0.5 GPa, 0.4 GPa, 0.3 GPa, or 0.2 GPa. Advantageously, the composite as described above is characterized in that the Young's modulus (E) is less than 2 GPa, particularly 1 GPa, 0.9 GPa, 0.8 GPa, 0.7 GP.

Advantageously, the composite as described above is characterized in that the Young's modulus (E) is less than 0.1 GPa, 0.09 GPa, 0.08 GPa, 0.07 GPa, 0.06 GPa 0.05 GPa, 0.04 GPa, 0.03 GPa, 0.02 GPa, 0.01 GPa.

More advantageously, the composite as described above is characterized in that the Young's modulus (E) is between 0.001 and 5 GPa, 0.005 and 4 GPa, 0.01 and 3 GPa, 0.05 and 2 GPa, 0.1 and 1 GPa, 0.2 and 0.7 GPa or between 0.3 and 0.5 GPa.

More advantageously, the composite as described above is characterized in that the Young's modulus (E) is equivalent to that of rubber, i.e., between 0.001 and 0.1 GPa, equivalent to that of polyethylene, i.e., between 0.2 and 0.7 GPa, equivalent to that of polystyrene, i.e., between 3 and 3.4 GPa, equivalent to that of Nylon®, i.e., between 2 and 5 GPa, in particular between 2.5 and 4 GPa.

The Young's modulus of the composite according to the invention is evaluated at room temperature, or about 20° C., and the values indicated above correspond to that temperature.

Thus, the composite according to the present invention is characterized in that the binder is an organic or inorganic binder, or a mixture of both.

Advantageously, the composite according to the present invention is characterized in that the binder is selected from a plastic, a latex, a rubber, a polyethylene, polypropylene, polyurethane, an epoxy polymer, vinyl ester, aqueous-phase polymers, Nylons®, polyamides, polycarbonates, polystyrenes, polymethylmethacrylate, a silica polymer such as a silicone, polydimethylsiloxanes, polythiazyls, polysilanes, polygermanes, more preferably a silica polymer. Advantageously, it is an elastomer binder as defined above, in particular with elasticity values as described above. Indeed, in the embodiments of the present invention, the elasticity of the initial polymer (without powder) is altered only very little by the addition of metal powder, in particular in the proportions (powder/binder) described below.

More advantageously, the composite according to the present invention is characterized in that the binder is selected from a plastic, a latex, a rubber, a polyethylene, polyurethane, an epoxy polymer, aqueous-phase polymers, Nylons®, polyamides, a silica polymer such as a silicone, polydimethylsiloxanes, polythiazyls, polysilanes, polygermanes.

Even more advantageously, the composite according to the present invention is characterized in that the binder is selected from a latex, a rubber, a polyethylene, polyurethane, Nylons®, polyamides, a silica polymer such as a silicone, polydimethylsiloxanes, polythiazyls, polysilanes, polygermanes More advantageously, the composite according to the present invention is characterized in that the powder comprises at least one metal selected from magnesium, tin, technetium, rhenium, titanium, iron, chromium, cobalt, gold, zinc, platinum, cadmium, aluminum, nickel, silver, beryllium, calcium and strontium.

Even more advantageously, the composite according to the present invention is characterized in that the powder comprises copper $Cu^0$, oxidized or phosphorized, preferably in a proportion of 60% up to 100% by mass of the metal powder.

More particularly, the object of the present invention relates to a composition of copper $Cu^0$ powder, oxidized and/or phosphorized as defined above wherein the copper mass is greater than or equal to 65%, advantageously greater than 70%, more advantageously greater than 75%, even more advantageously greater than 80%, even more advantageously greater than 85%, even more advantageously greater than 90%, even more advantageously greater than 95%, even more advantageously greater than 97%, even more advantageously greater than 98%, even more advantageously greater than 99%, even more advantageously greater than 99.5%, even more advantageously greater than 99.9% by mass relative to the total mass of the powder composition.

With regard to the density of the powders used, it is generally between 1 and 5 g/cm$^3$, more particularly between 1.5 and 3 g/cm$^3$, 1.5 and 2 g/cm$^3$, 2 and 3 g/cm$^3$, 2 and 2.5 g/cm$^3$, 2.5 and 3 g/cm$^3$. The density will depend on both the particle size and the chemical nature of the powder, for example of its degree of oxidation.

Advantageously, the composite according to the present invention is characterized in that the oxidation ratio of the copper is greater than 95% by mass of oxidized copper relative to the total mass of copper in the powder.

Preferably, the oxidized copper composition according to the present invention is characterized in that the copper grains are oxidized to the core.

The oxidized copper composition according to the present invention is characterized in that copper is oxidized in various proportions: for example, the oxidized copper composition may be oxidized in a proportion of 5%, 10%, 15%, 20%, 25%, 30%, 35%, 40%, 45%, 50%, 55%, 60%, 65%, 70%, 75%, 80%, 85%, 90% or 95% by mass of oxidized copper relative to the total mass of copper.

This degree of oxidation makes it possible to adjust the biocidal activity of the composite of the present invention.

According to an embodiment of the present invention, the oxidized copper composition incorporated into the composite according to the present invention is characterized in that the oxidation ratio of the copper is greater than 95% by mass of oxidized copper relative to the total mass of copper and/or in that the amount of phosphorus is between 2% and 16%, preferably 8% by mass relative to the total mass of powder.

For example, according to an embodiment of the present invention, the oxidized copper composition incorporated into the composite according to the present invention is characterized in that the oxidation ratio of the copper is 95.5%, 96%, 96.5%, 97%, 97.5%, 98%, 98.5%, 99%, 99.5%, 99.7%, 99.8%, 99.9% or 100% by mass of oxidized copper relative to the total mass of copper.

Furthermore, techniques for determining copper content are extremely common in the art and may be carried out by chemical and/or physical means.

Advantageously, the composite according to the present invention is characterized in that the metal powder comprises at least one non-metallic inorganic compound such as nitrogen, oxygen, phosphorus, sulfur, fluorine, chlorine, bromine, carbon, silicon.

Advantageously, the composite according to the present invention is characterized in that the composite comprises a proportion by mass of powder to binder of 1:2 to 2:1 respectively, preferably of 1.2:1 to 1.6:1 respectively. For example, the composite of metal powder and binding agent as defined above is characterized in that the proportion by mass of powder to binder in the composition is from 1.1:1 to 1.8:1 respectively, from 1.15:1 to 1.6:1 respectively, from 1.2:1 to 1.4:1 respectively, from 1.25:1 to 1.3:1 respectively, or is 1.275:1 respectively.

Advantageously, the composite according to the present invention is characterized in that said composite comprises a concentration gradient of powder grains, for example directed from the inside toward the outside of the composite and preferably increasing.

Advantageously, the composite according to the present invention is characterized in that said composite comprises a support or contains a reinforcement structure.

Advantageously, the composite as above is characterized in that the reinforcement structure is a woven or nonwoven web.

Advantageously, a fabric used as woven or nonwoven web may be a natural fabric, such as cotton, or a synthetic fabric, such as Nylon®.

Advantageously, the present invention relates to the composite according to the present invention for use as a film, preferably heat-shrinkable, or as a textile, preferably on a roll.

Advantageously, the present invention relates to the composite according to the present invention for use as a substrate, in particular thread or filament, for 3D printing.

By 3D printing is meant additive manufacturing methods. These methods were developed for rapid prototyping and, by way of example, mention may be made of a few coexisting technologies: fused deposition modeling (FDM) or stereolithography (SLA: UV light solidifies a layer of liquid plastic). Thus, the composite according to the invention may be used to fabricate articles by 3D printing via FDM or SLA technology. In particular, FDM consists in melting a filament of synthetic material such as a composite according to the invention through a nozzle (an extruder) heated to a temperature varying between 160° C. and 400° C. (in the context of polymer fusion). A thin plastic thread in the melting state exits therefrom and it is deposited in a line and comes to adhere by re-melting to the material deposited previously. Thus, reels of composite according to the invention can be used with 3D printing technology, in particular fused deposition modeling. In the present case, the composition binder is a thermoplastic binder.

The composite according to the invention may also be used with SLA technology wherein the binder is a polymer that can be hardened by a UV-activatable curing catalyst.

Advantageously, the present invention relates to the composite as defined herein for use as a curtain, an adhesive film, a sleeve, such as a door-handle sleeve, a tray, a garment or a part of a garment, a bag, a pouch, a tarpaulin, or as a tablecloth. These various objects can be used in the technical fields requiring in particular a sterile or microorganism-depleted environment, such as agri-food, pharmaceutical or healthcare environments.

The present invention also relates to the composite as defined in the present description for the fabrication of granules, plates and ingredients for plastics technology.

The composite granules and plates according to the invention may be advantageously used for the fabrication of parts and articles formed by known plastics technology techniques.

With regard to the techniques for forming the composite according to the invention, mention may be made of:

Contact molding: Manual method for producing parts from thermosetting resins, at room temperature and without pressure. The reinforcements may be deposited on the mold and impregnated with liquid resin, accelerated and catalyzed, to be gradually formed by means of bubble-removing rollers and brushes. After the resin hardens, the part is unmolded and trimmed.

Molding by simultaneous spraying: Manual or automated method for fabricating parts from thermosetting resins at room temperature and without pressure. The raw materials are applied using a so-called "spraying" machine comprising a cutting device, a spraying of the optional reinforcement (roving) and one or two spray guns spraying the resin simultaneously. The cut threads and the resin are sprayed onto the mold surface and then compacted and bubbles are removed using rollers. The pre-accelerated resin is catalyzed continuously as it is sprayed.

Vacuum molding: carried out between mold and rigid, semi-rigid or flexible counter-mold according to the characteristics of the parts.

A reinforcement (mat, fabric, preform) may be placed inside the mold; the catalyzed resin is cast into the mold. One uses the pressure exerted on the mold during the vacuum process to distribute the resin and to impregnate the optionally-present reinforcement. The resin may also be admitted intermittently by aspiration consecutive to the vacuum.

Injection molding: Resin transfer molding (RTM) is carried out between rigid mold and counter-mold. A reinforcement (mats, preform, possibly fabrics) may be disposed in the gap between the molds. Once the latter are firmly closed, the resin, accelerated and catalyzed, is injected under low pressure (1.5 to 4 bar) through the reinforcement until the impression is completely filled. After the resin cures, the mold is opened and the part unmolded.

Low-pressure "wet" cold-press molding: using a compression press between rigid mold and rigid counter-mold, initially with no external heat supply.

With the mold open, the reinforcement can be positioned on the lower part of the mold and the resin, equipped with a highly-reactive catalytic system, is poured in bulk onto the reinforcement.

Closing the mold under pressure (2 to 4 bar) leads to distribution of the resin in the impression and impregnation of the reinforcement. The hardening of the resin is gradually accelerated by the increased temperature of the mold due to the exothermic nature of the reaction, which allows rapid unmolding.

Bulk Molding Compound (BMC)

Bulk molding compound prepared in a mixer is a moldable mass consisting of resin, various fillers and adjuvants, reinforced with cut glass fiber as need be.

The composite is heat molded (130-150° C.) by injection (chiefly) between mold and counter-mold of machined steel. The closing pressure (50 to 100 bar) of the mold leads to creep of the pre-measured material and filling of the impression. The very short curing time enables rapid unmolding.

Centrifugal Molding

Inside a mold rotating at low speed are deposited particles of the catalyzed and accelerated resin and optionally granular fillers. The rotational speed of the mold is then increased to remove bubbles from the material and to make the material denser. After the resin is cured, optionally accelerated by a heat supply, the part can be extracted from the mold very easily. This technology also applies to thermoplastic resins where the mixture is heated to fluidify it, which allows, as the mold rotates, distribution into the shapes of said mold. The mixture is cooled and solidified and the part is unmolded.

Advantageously, the composite film or textile according to the present invention is characterized in that it has at least one additional adhesive layer. The addition of an adhesive on the composite of the present invention may be carried out by any technique known in the art, such as the spraying of an adhesive agent, or by soaking, impregnation, etc.

The present invention also relates to a fabrication method as described above.

The fabrication of a metal powder as defined above is carried out by techniques common in the field. Generally, fractionation of the metal into powder can be carried out by any technique known in the art, whether by mechanical, chemical or physical fractionation, etc. It is possible to obtain the desired powder according to the present invention directly by adequate fractionation, which involves perfect control of the technique by the operator who, nevertheless, calls upon general knowledge of the art. Moreover, an easier alternative technique is well-known in the art, which consists in fractionating the material coarsely with relatively irregular particle size, followed by successive sieving operations, in order to isolate particular powder populations (i.e., of particular and regular particle size). In the context of the present invention, this technique is quite applicable: A rough fractionation can be carried out, followed by a step of sampling and isolating the particular powders, then a step of selecting the powder in order to reconstitute the powder according to the invention. These techniques are extremely common in the art. Indeed, the control of particle size forms part of the general knowledge of the skilled person. Thus, it is obvious in the context of the present invention that it is possible to add other compounds/powders in order to obtain a "mixed" composition, having the technical effects disclosed herein in addition to other effects provided by the secondary compounds/powders added. Advantageously, the powders with given particle size were obtained by any one of the fractionation techniques known in the art, followed by passing at least twice over molecular sieves to ensure that the size of the particles constituting the powder are neither too small nor too large in given amounts, thus ensuring perfect control of the essential features needed to carry out the present invention. Nevertheless, and preferably, fractionation is carried out by an atomization technique, for example with water (following metallic melt).

A suitable powder can be obtained from the company POUDMET (France), for example.

Thus, the method for fabricating a composition according to the present invention is characterized in that the metal powder, preferably copper ($Cu^0$, oxidized and/or phosphorized), is obtained directly by fractionation or is reconstituted from several powders with given particle sizes and proportions of metals (e.g., copper).

Advantageously, the particles obtained by such techniques are between 8 and 150 μm (D50) and/or the amount of oxygen comprised in the composition is between 0.3% and 5% by weight.

Nevertheless, according to an embodiment of the invention the oxidation of the copper itself may occur after fractionation by passing the composition in the oven under controlled atmosphere.

With regard to oxidized copper powder, for example, oxidation may occur at a temperature equal to or greater than 500° C. in the presence of oxygen and/or an oxygen source, preferably in the presence of magnesium or phosphorus. According to an embodiment, the temperature is greater than 800° C., 1000° C., 1500° C. or 2000° C.

Oxygen or an oxygen-containing gas may be blown directly into the copper. Generally, this is done in open air. A compound of the powder itself which, when heated, releases oxygen may also be incorporated. Of course, the copper may be fractionated before being heated in order to enable better oxidation. The copper may nevertheless be oxidized before being fractionated into powder.

Advantageously, the fabrication method according to the present invention is characterized in that, before step (c), a support or a reinforcement structure is added to the composite or deposited in the mold.

Furthermore, the composite (solid) according to the present invention may be fabricated by any technique known in the field applicable to the fabrication of flexible compounds such as rubber. Thus, extrusion, thermoforming and coating techniques, etc., are quite applicable to the present specific case.

EXAMPLES

In order to illustrate the present invention, the following examples were prepared. In no case is the object of the present invention limited to these examples alone.

1. CuP$_8$-Based Powders

CuP$_8$ powder, the particle size of which is not controlled, is known to be used in brazing.

Conventionally, it has the following characteristics:
Nominal composition (% mass): Cu: 92
P: 8
Melting point: 710-750° C.
Density: 8 g/cm$^3$
Protocol for fabricating the copper-phosphorus powder according to the invention According to the present invention, the copper-phosphorus alloy containing a percentage of phosphorus between 2% and 16%, preferably 8%, is introduced into the melt bath. This alloy is then atomized with water under conditions such that the particle size results must be between 8 and 150 μm (D50); the oxygen content is between 0.3% and 5% by weight.

The following powder was thus obtained:

TABLE 1

| Particle size, cumulative % retained (ISO 4497) | | |
|---|---|---|
| Particle size | Percentages by interval | Cumulative percentages retained |
| ≥125 μm | 0.0 | 0.0 |
| ≥106 μm | 0.9 | 0.9 |
| ≥90 μm | 4.5 | 5.4 |
| ≥75 μm | 6.6 | 12.0 |
| ≥63 μm | 8.4 | 20.4 |
| ≥45 μm | 20.8 | 41.2 |
| <45 μm | 58.8 | 58.8 |
| Total | 100% | 100% (41.2 + 58.8) |

Density obtained: 2.67 g/cm$^3$ (ISO 3923/2)
P % obtained: 8.0% by mass

2. Oxidized Copper Powder

The same protocol as for copper-phosphate was applied for copper.
The following powder was thus obtained:

TABLE 2

| Particle size, cumulative % retained (ISO 4497) | | |
|---|---|---|
| Particle size | Percentages by interval | Cumulative percentages retained |
| ≥125 μm | 0.0 | 0.0 |
| ≥106 μm | 1.0 | 1.0 |
| ≥75 μm | 8.1 | 9.1 |
| ≥63 μm | 7.9 | 17.0 |

TABLE 2-continued

| Particle size, cumulative % retained (ISO 4497) | | |
|---|---|---|
| Particle size | Percentages by interval | Cumulative percentages retained |
| ≥45 μm | 19.2 | 36.2 |
| <45 μm | 63.8 | 63.8 |
| Total | 100% | 100% (36.2 + 63.8) |

Density obtained: 2.88 g/cm$^3$
O$_T$ %: 0.35% by mass (ISO 4491-4)

Next, the powder obtained passed into a conveyor oven at a temperature above 500° C. (about 800° C. in the present case) in order to oxidize it, under controlled atmosphere.

A powder with the same particle size as before was obtained with:
density: 1.60 g/cm$^3$
O$_T$ %: 0.08% by mass
Cu %>99.7% by mass 3. Example of the Composite Obtained The composites are obtained simply by mixing the compounds together.

It is strongly advised to respect the curing times of the composite (about 20 min at 20° C. per layer; impregnation to be carried out within this time if a woven/nonwoven web is present). The binder may be heated beforehand to fluidify it, which reduces the curing time.

TABLE 3

| Composite(s) obtained | |
|---|---|
| | Composite |
| Metal powder | CuP$_8$ (powder of Example 1) |
| Binder (proportions by mass) | ISOCYANATE 74% |
| Curing agent (proportions by mass) | POLYOL 26% |
| Proportions by mass of powder to binder | Powder = 1 Binder = 1 |
| Suspension possible | yes |
| Curing time | 20 minutes |

Figure 1:
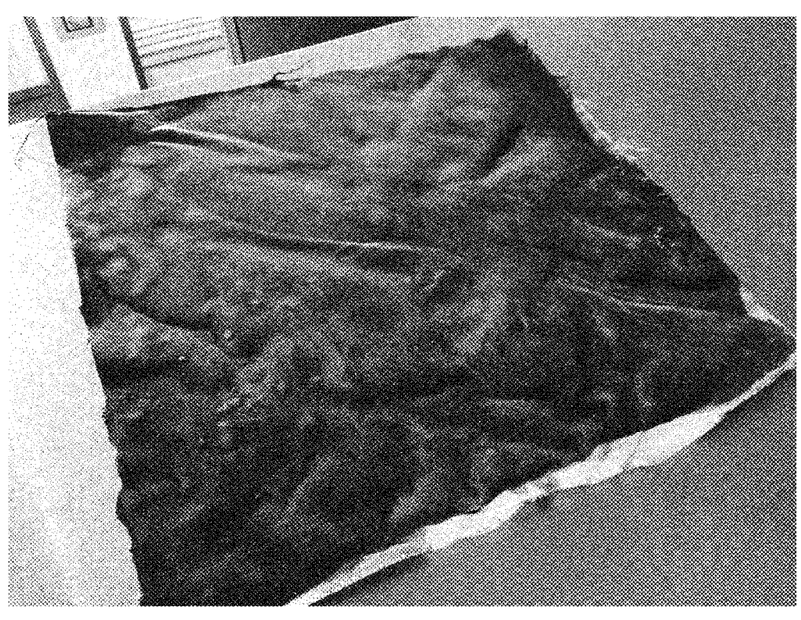
FIG. 1: Photograph of the fabric obtained according to Example 3.

For example, the composite of Table 3 was impregnated simply by soaking into a woven web (commercial fabric comprising synthetic and natural fibers) before the effective curing time (see FIG. 1: photograph of the material obtained). The fabric obtained kept its initial mechanical properties (flexibility) while having the additional physico-chemical properties provided by the composite of Table 3.

4. Biocidal Activity

Copper powders (Cu$^0$, oxidized and/or phosphorized) have been studied previously in rigid coatings and demonstrated proven biocidal activity. The composite according to the present invention thus also has the same biocidal activity.

The invention claimed is:

1. A polymer composite consisting of:
an elastomer binder,
a metal powder comprising 30% by mass of grains with a diameter greater than 45 μm, dispersed in the binder;
wherein said composite has a Young's modulus (E) less than 0.5 GPa, wherein the metal powder consists of copper Cu$^0$, oxidized copper and/or phosphorized copper, wherein the proportion by mass of metal powder to binder is 1.2:1 to 1.6:1, and wherein said polymer composite has a concentration gradient of powder grains directed from the inside toward the outside of the composite.

2. The composite according to claim 1 wherein the density of the metal powder within the polymer composite is 1.5 to 3 $g/cm^3$.

3. The composite according to claim 1, wherein the binder is a plastic, a latex, a rubber, a polyethylene, polypropylene, polyurethane, an epoxy polymer, vinyl ester, aqueous-phase polymers, nylons, polyamides, polystyrenes, or a polymethylmethacrylate.

4. The composite according to claim 1, wherein the oxidation ratio of the copper is greater than 95% by mass of oxidized copper relative to the total mass of copper in the powder.

5. The composite according to claim 1, wherein said composite is a deposit on a support.

6. A method for fabricating the composite according to claim 1, comprising the steps:
 (a) mix a precursor of the elastomer binder in the liquid state with the metal powder;
 (b) cast the mixture obtained in step (a) into a mold;
 (c) solidify the mixture of step (b), by varying the temperature or by adding a catalyst; and
 (d) release the composite from the mold.

7. The fabrication method according to claim 6 wherein, before step (c), a support or a reinforcement structure is added to the mixture or deposited in the mold.

8. A film or textile comprising the composite according to claim 1.

9. The film or textile according to claim 8 having at least one adhesive layer.

10. The composite according to claim 1 embedding a reinforcement structure.

11. The composite according to claim 10 wherein the reinforcement structure is a woven or nonwoven web.

* * * * *